July 3, 1956     G. C. ELLERBECK     2,753,114
DIVISION TERMINATING MECHANISM
Filed July 1, 1952     5 Sheets-Sheet 1
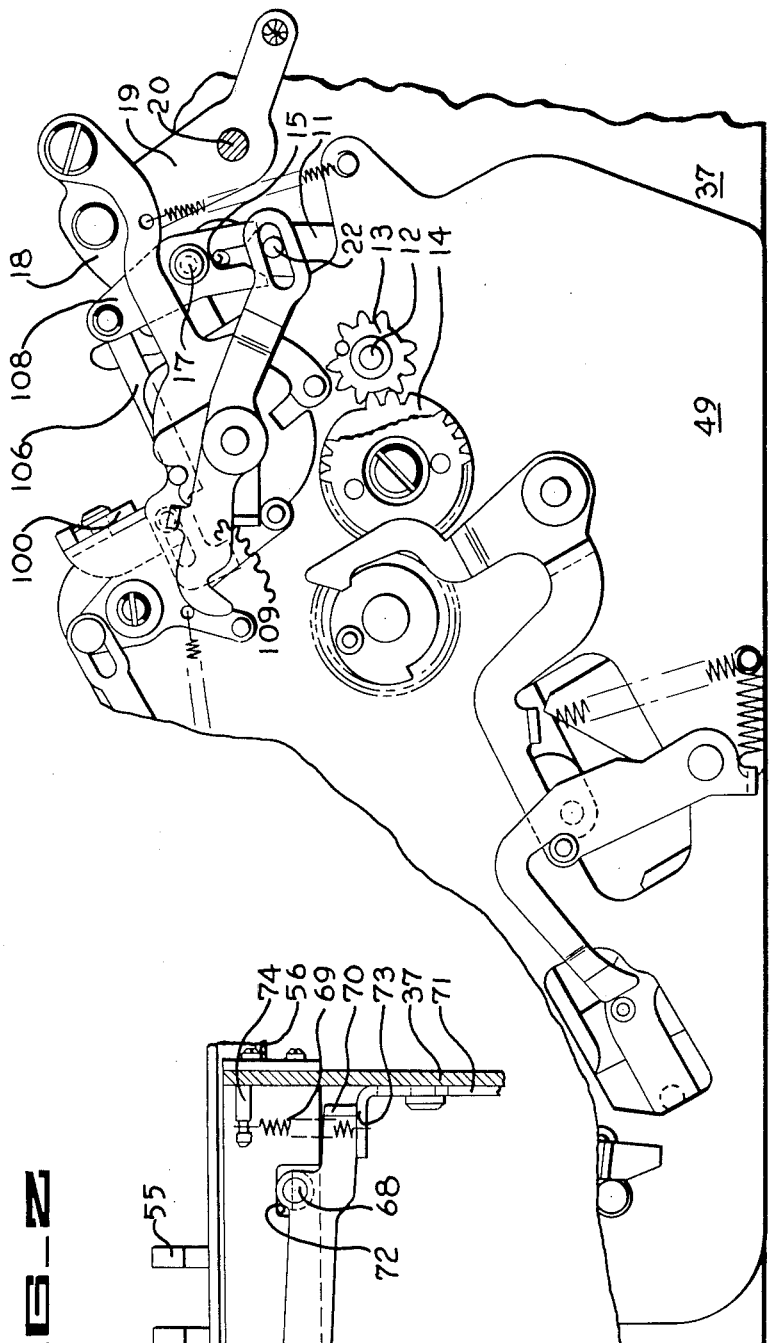
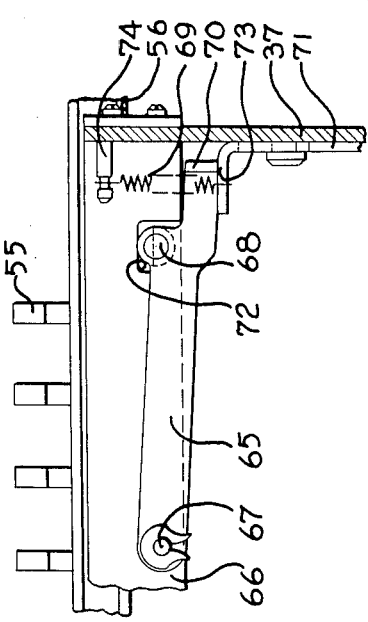
GRANT C. ELLERBECK
INVENTOR
BY
ATTORNEY

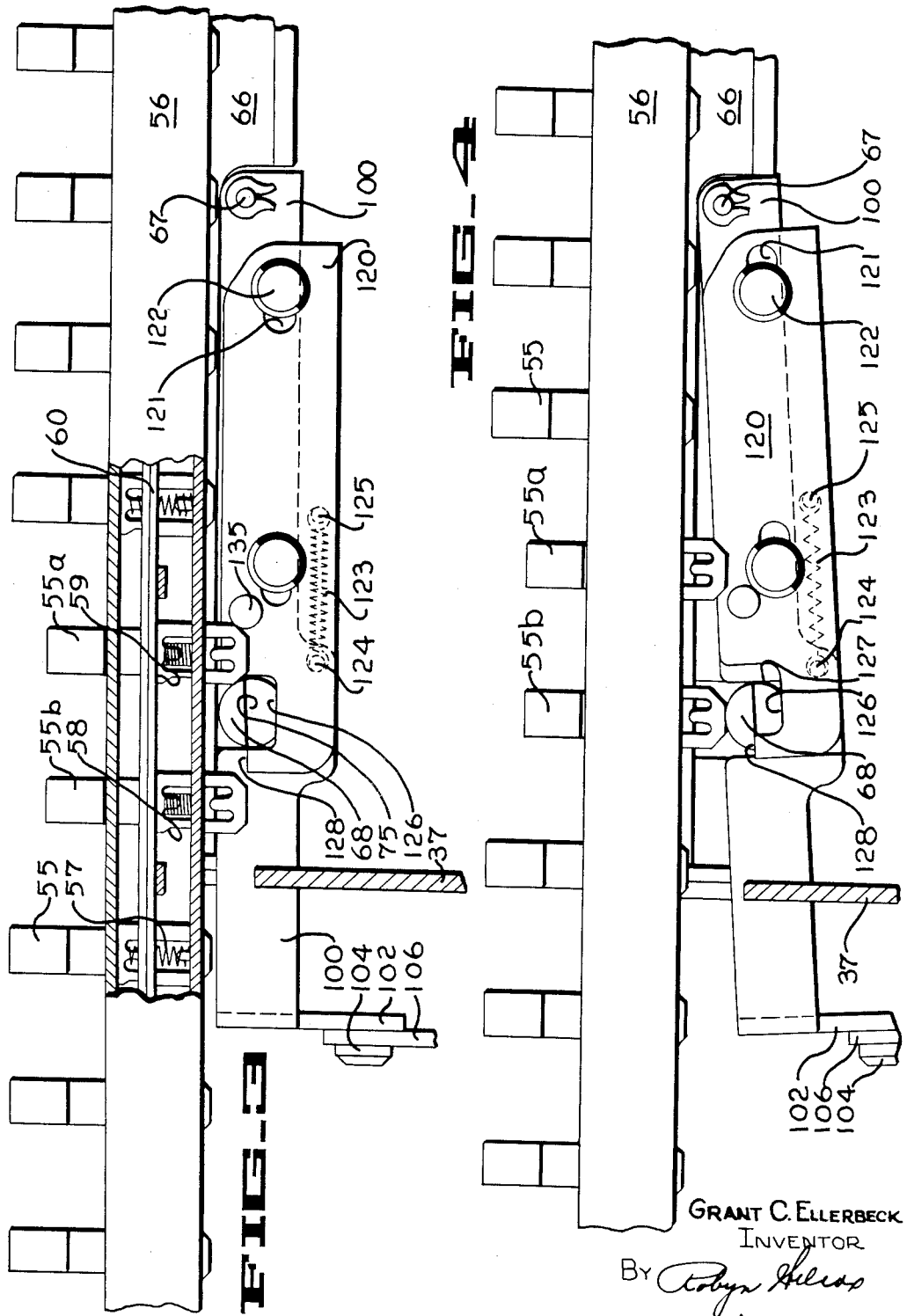

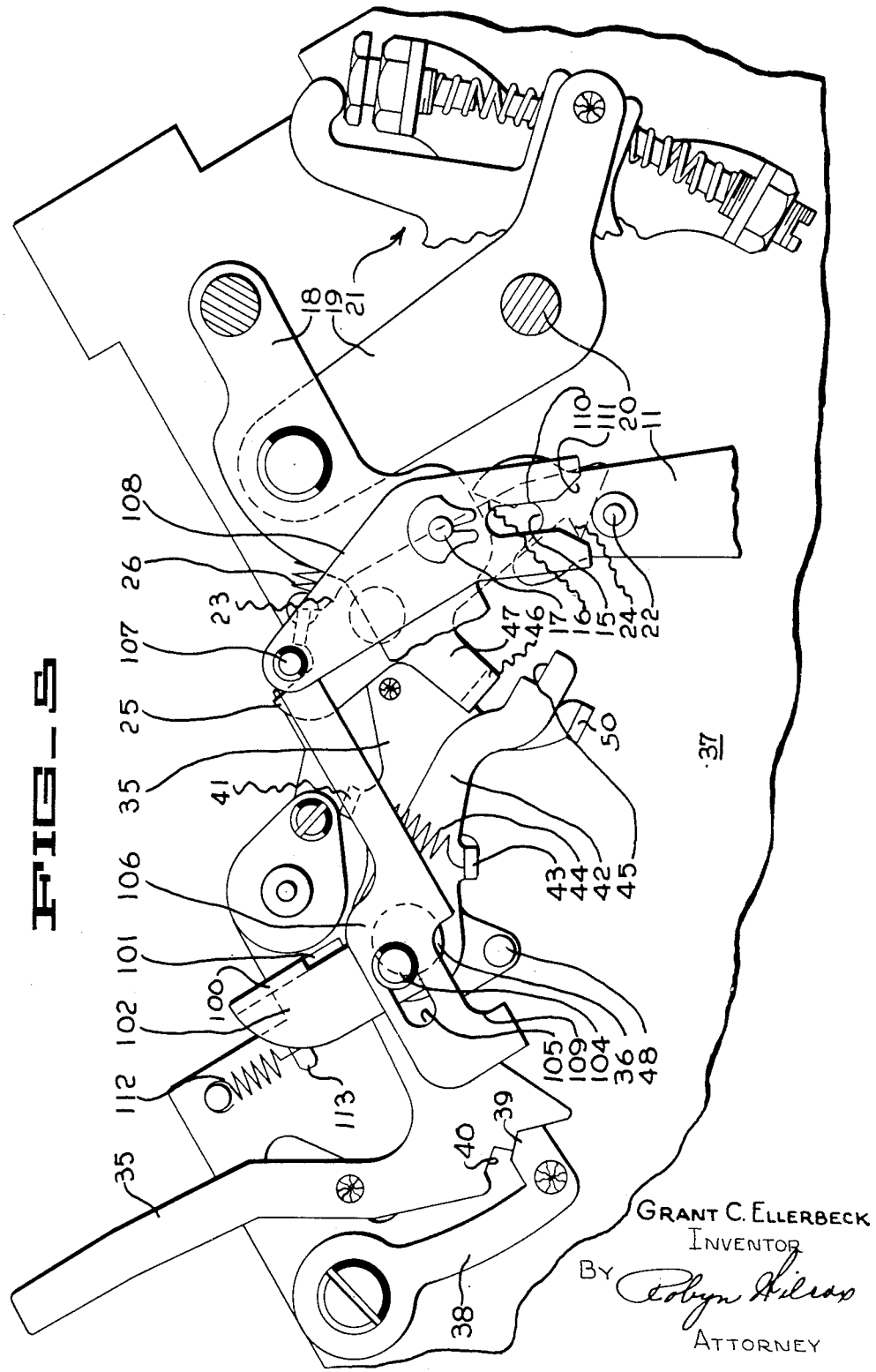

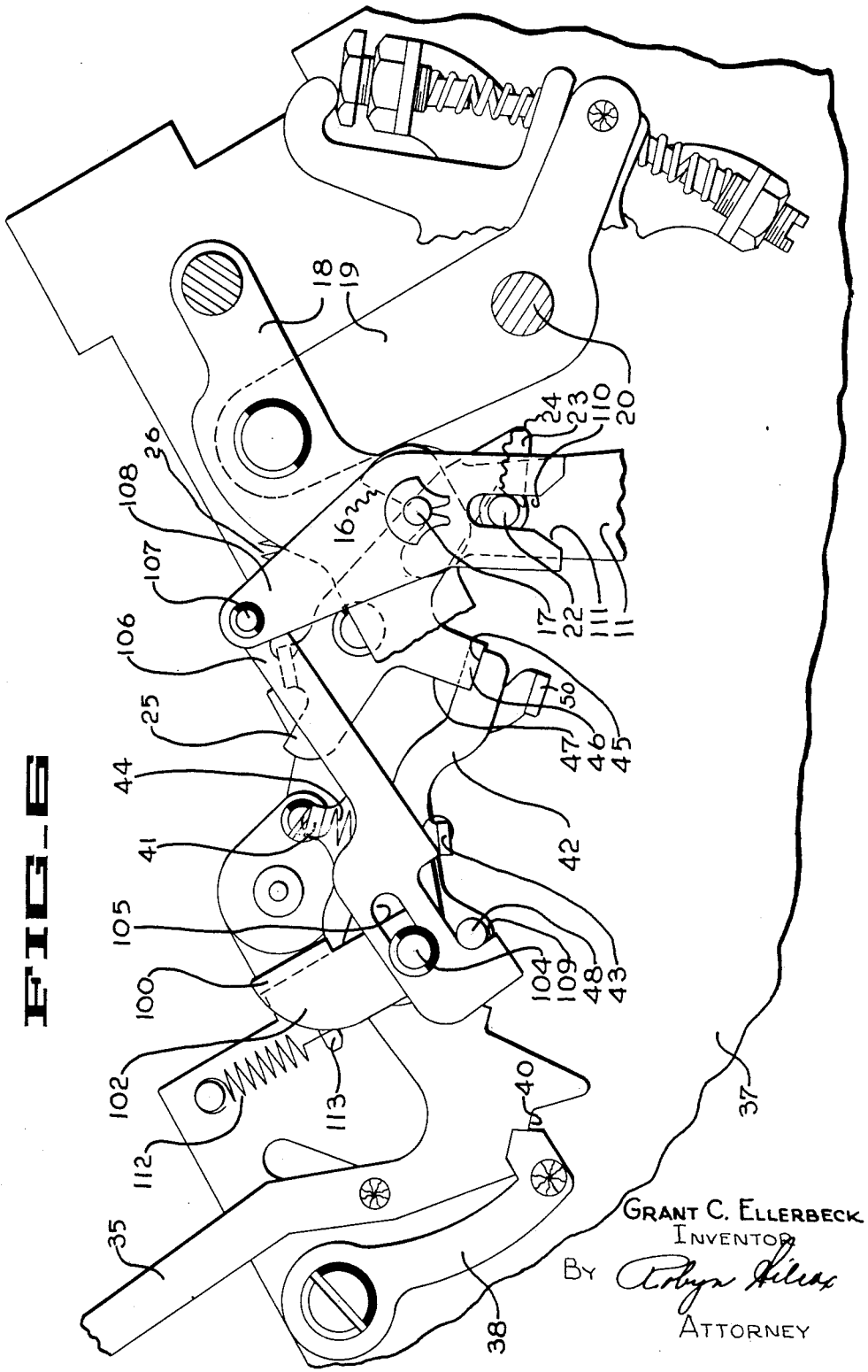

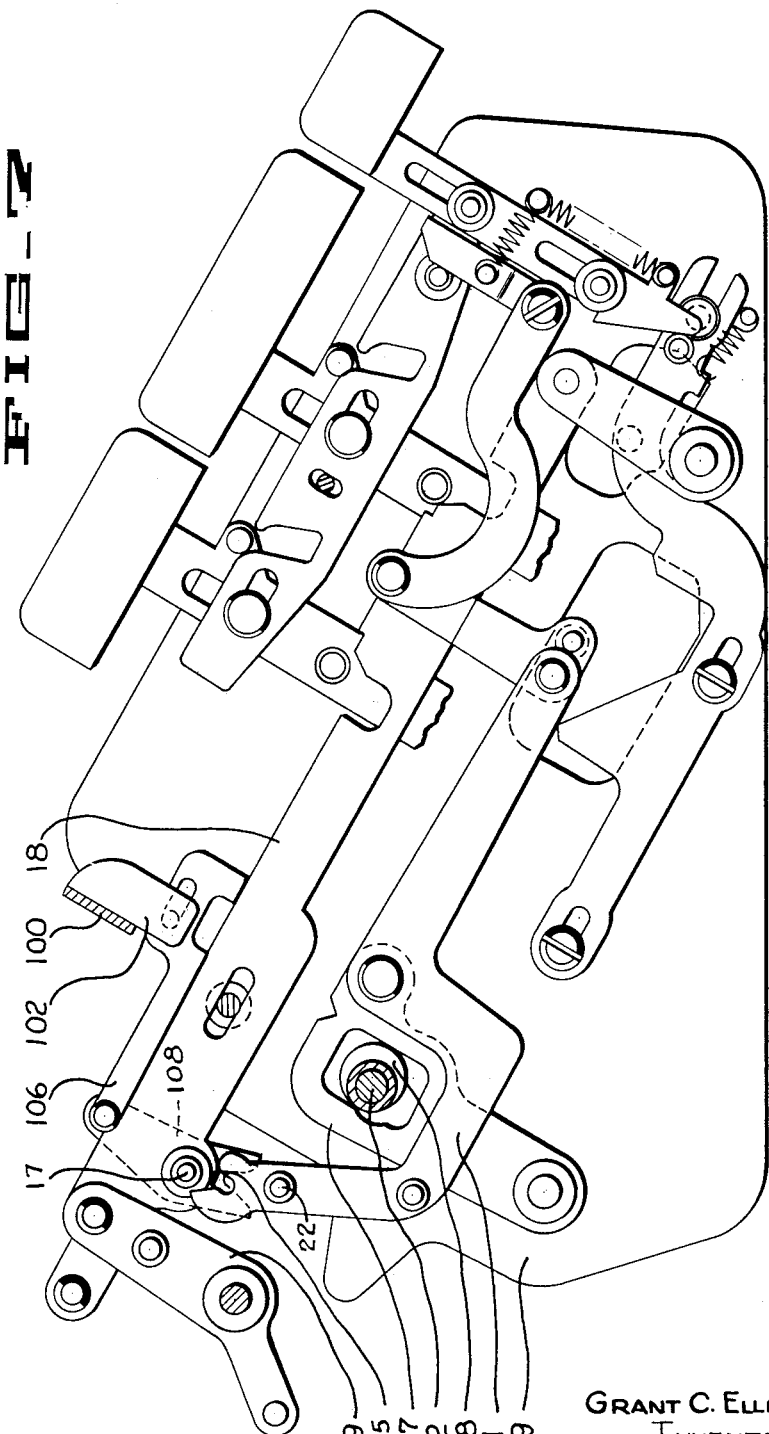

United States Patent Office 2,753,114
Patented July 3, 1956

2,753,114
DIVISION TERMINATING MECHANISM

Grant C. Ellerbeck, San Leandro, Calif., assignor to Friden Calculating Machine Co., Inc., a corporation of California Application July 1, 1952, Serial No. 296,537

12 Claims. (Cl. 235—62)

This invention relates to calculating machines and particularly to a mechanism for selectively stopping a division operation automatically in any predetermined ordinal position of the calculator carriage.

A primary object of the present invention is to provide a mechanism by means of which an operator is enabled to selectively terminate a division operation in any predetermined decimal position of the quotient. One common and specific illustration of what I have in mind is in connection with a calculator for the grain trade in which, at least in many grain shipping centers, it is customary to furnish a statement showing the total weight in pounds, the total whole number of bushels with a balance in pounds, and the total cash value, the latter requiring the number of bushels with the balance in pounds expressed as a decimal fraction in order to determine the value. For example, assume a shipment of 65,753 lbs. of corn priced at $1.25 per bushel. In such a problem the divisor and dividend normally are set around a predetermined decimal point, in order to prevent errors resulting from a misplaced decimal point. In the conventional calculating machines heretofore known, it is necessary to manually operate the division stop key as soon as the division operation reaches the units order of whole bushels in order to stop the division operation at the end of that ordinal operation. In the particular problem this gives a whole quotient of 1174 (bushels), with a balance of "9" in the dividend register (the latter indicating the number of pounds). These figures are copied on the statement, and the division operation continued to get the decimal value of the 9 (pounds) in order to multiply that value by the price of $1.25 to give a total value of $1,320.93. The present invention is directed to a mechanism particularly adaptable to stop the division operation, automatically, in any preselected order, at the will of the operator.

Another object of the present invention is to provide an improved division stop mechanism.

A further object of the present invention is to provide a division stop mechanism which is selectively operable at the will of the operator at any time during the course of a division problem, but which can be preset to stop the operation in any preselected decimal position of the quotient.

These and further objects of the present invention will be apparent from the specification and claims which follow.

The invention will be readily understood by reference to the drawings in which:

Fig. 1 is a partial right side elevation of the machine of the present invention, showing only those portions of the division mechanism relating to the present invention, and showing the mechanism of the present invention in its normal, or inoperative, position.

Fig. 2 is a front view of the conventional tabulating mechanism of the machine with which my invention is preferably associated.

Fig. 3 is a rear elevation, in enlarged detail, of a portion of the mechanism of my invention immediately before it becomes operative to terminate a division operation in a predetermined order (the mechanism being shown in the order next higher than the preselected order).

Fig. 4 is similar to Fig. 3, but shows the arrangement of the mechanism of my invention when the carriage is in the preselected order for termination of division.

Fig. 5 is a right side elevation, in enlarged detail, of the mechanism of my invention with the parts in their normal, or inoperative, condition.

Fig. 6 is a view similar to Fig. 5, showing the position of the parts after the correction of the overdraft in the preselected order, immediately prior to the stopping of the division operation.

Fig. 7 is a left side elevation of the auxiliary control plate, showing a portion of the division mechanism.

For purposes of exemplification, I show and describe my invention in connection with the commercial calculating machine manufactured under the patents to Friden, No. 2,229,889, dated January 28, 1941, or No. 2,327,981, dated August 31, 1943; as modified by the patent to Friden, et al., issued July 2, 1946, No. 2,403,273, for a tabulating mechanism, and the patent of Anthony B. Machado, et al., No. 2,714,990, issued August 9, 1955, for a division stop mechanism. It will be understood however, that the invention is not limited to incorporation in such a machine as it can be incorporated in, or applied to, other commercial calculating machines on the market. It will be understood therefore, that the machine shown in the accompanying drawings and described herein is for purposes of exemplification only and that the invention is not limited thereto.

The mechanisms of said patents are well-known and will not be shown and described herein. Only so much of said mechanisms as is essential to an understanding of the present invention, and its location in the machine of said patents, will be mentioned. The machine with which my invention is associated is provided with a conventional automatic division mechanism fully shown and described in said patents, and which, for the sake of brevity, will not be shown and described here. It should be mentioned, however, that the programming of a division operation is under the control of a connecting, or control, lever 11 (see Figs. 1, 5, 6 and 7). This lever is pivotally secured to a cam follower arm 27 (Fig. 7), pivotally mounted on auxiliary frame plate 49 and which is controlled by a cam 28 on program shaft 12 (Fig. 1). This shaft at its right-hand end, carries a multilated gear 13 having three sets of three teeth, normally lying in a plane to the left of its two-toothed driving gear 14. The program shaft 12 is shifted to the right upon the occurrence of an overdraft during division operations, whereupon the multilated gear 13 is positioned in the plane of its driving gear 14. This translation, or axial shifting, of shaft 12 and mutilated gear 11 takes place about the 330° position of the two-tooth driving gear 14 (the two gears being shown in Fig. 1 in their full-cycle positions and in their normal planes in which driven gear 13 lies to the left of the plane of driving gear 14). The mutilated gear is driven half an increment or about 60°, before the end of the cycle in which the overdraft occurs, and another like increment at the beginning of the succeeding cycle—the increment being completed before digitation begins in the succeeding cycle. Thus the mutilated gear 13 is driven through successive increments of 120° in three successive cycles, beginning in the cycle in which the overdraft occurs, each cycle actually beginning about the 330° position of the driving gear but in fact extending over into the following cycle of machine operation. By the time the digitation phase begins in the first cycle after the overdraft, the multilated gear is in the 120° position, and the control lever 11 is in its rearward, or additive, position in order to set the digitation mechanism for addition, thereby adding the divisor into the dividend a single time to correct the overdraft. At the end of this first cycle of operation the gear is driven toward the 240° position, and the lever 11 is positioned in its neutral position, to enable a carriage shift of one order to the left during the second cycle of operation following the overdraft. At the end of this second cycle the gear is returned to the 0° position, whereupon the control lever 11 is positioned in its subtractive position to commence a series of subtractive operations, prior to the beginning of the digitation phase of the third cycle, which continues until the overdraft mechanism is again operated.

When a division operation is initiated, the connecting lever 11 is rocked (upwards, or counter-clockwise in Figs. 1, 5 and 6 and clockwise in Fig. 7), whereupon a slot 15 in the upper end of the lever engages a pin 17 on a digitation control slide 18. The slot 15 is provided with a cam face 16 (Fig. 5) which first engages the pin 17, thereby camming the digitation control slide 18 forwardly (or to the left in Figs. 1, 5 and 6, or to the right in Fig. 7). The digitation control slide 18 is pivotally mounted on an arm 19 which is rigidly secured to a transverse shaft 20. The rocking of the shaft 20 positions a digitation control gate, by means not here shown, but fully described and shown in said patents. It can be mentioned, however, that forward (or counter-clockwise in Figs. 1, 5 and 6) rocking of the shaft 20 causes the machine to operate subtractively, and rearward (or clockwise) movement of the shaft causes it to operate additively. Thus, the initiation of a division operation causes the lever 11 to cam the digitation control slide 18 forwardly to rock the mechanism into subtractive position in order to subtract the divisor standing in the keyboard (not shown) of the machine from the dividend standing in the register (not shown). Normally this mechanism is maintained in a central, or neutral, position by a conventional centralizer 21.

The control lever 11 is latched in its operative position by means of a pin 22 adjacent the upper end thereof, which is engaged by a shoulder 24 of a latch member 23. The latch is resiliently biased in an engaging direction (clockwise in Figs. 5 and 6) by a suitable spring 26. These parts are shown in their inoperative position in Fig. 5 and in their operative position in Fig. 6. When the control lever 11 is latched in its operative position by the latch 23, it causes the machine to cycle continuously in a subtractive manner. Upon the occurrence of an overdraft, the resulting rotation of shaft 12, in its first incremental step, and consequent movement of follower arm 27, causes the lever 11 to move rearwardly, thereby causing the machine to cycle additively. At the end of the first cycle, the lever is shifted to its neutral position, and a left shift is initiated. Finally, at the end of the second cycle of programmed operation the lever 11 returns to its original position and the machine again operates subtractively.

Normally the latch 23 follows movement of lever 11, the rearward rocking of the lever forcing the latch counter-clockwise against the tension of its spring, and the spring 26 causing the latch to rock clockwise to follow forward movement of the lever. Means is provided, however, for unlatching the latch 23 to terminate a division operation. For example, the latch 23 is automatically released after the additive cycle when the carriage is in the extreme left-hand position. In this instance the latch is held in its counter-clockwise position by a live pawl (not shown) on the carriage getting behind the upper end 25 of the latch when the link 11 moves rearward to initiate the additive cycle. The pawl, being behind the upper end of the latch prevents the latter from following forward motion of the lever 11, thereby permitting the link to drop and the division operation to be terminated.

Means is also provided for terminating division selectively at the will of the operator during the occurrence of a division operation, and in any ordinal position of the carriage. These means are shown particularly in Figs. 5 and 6. In these figures I show a conventional division stop mechanism, which I prefer to use with my invention. Such a mechanism comprises a lever 35 pivotally mounted, as by a flat headed pin 36 (shown in Fig. 5), on the main frame plate 37. The lever is shown in Fig. 5 in its central, or normal, inoperative position; and in Fig. 6 in its forward, or operative, position in which it stops division at the end of the shift cycle of the division program, i. e., after the overdraft has been corrected. The lever 35 is held in either adjusted position by a spring-powered detent 38, the nose 39 of which engages suitable notches 40 in the lever 35. It can be mentioned that the lever has a third or rearward position (clockwise of that shown in Fig. 5), in which it is operative to stop division operation immediately (in which position it cannot be latched). The rear end of the lever 35 is provided with a perpendicular ear 41 adapted to be used as a spring seat. Associated with the lever 35 is a second lever 42, likewise pivotally mounted on the pin 36. This second lever has a perpendicular ear 43, also adapted to form a spring seat. A tension spring 44 between the two ears 41 and 43 resiliently biases the second arm 42 to follow arm 35 when the latter is rocked counter-clockwise from the Fig. 5 to the Fig. 6 position. The rear end of the second lever 42 is provided with a latching notch, or shoulder, 45 adapted to engage an ear 46 on a forwardly extending arm 47 integral with the latch 23. Thus, when the lever 35 is rocked forwardly (counter-clockwise from the Fig. 5 to the Fig. 6 position) the second arm is also rocked until its upper edge engages the ear 46. Thereupon the spring 44 can yield, permitting the lever 35 to be latched in its forward position. Thereafter, when the overdraft in that order of operation occurs, the connecting or control, lever 11 is rocked rearwardly to initiate the corrective additive cycle. The latch 23 rocks counter-clockwise with the lever 11, whereby the ear 46 moves counter-clockwise along the edge of arm 42 until the ear registers with the notch 45. The spring then urges the arm 42 into locking relationship with ear 46 and latch 23. Thereafter, at the termination of the shifting cycle, when the control lever 11 is shifted forwardly to throw the machine into a series of subtractions, the latching lever 23, being held by the arm 42, is pushed out from under the latching pin 22. The release of the pin 22 by the latch 23 permits the control lever 11 to drop, terminating division immediately.

I prefer that my invention be associated with a tabulating mechanism of conventional design, such as that described in the Patent No. 2,403,273 above-mentioned, part of which is shown in Figs. 2, 3 and 4. In its preferred form, such a mechanism includes a plurality of tabulating keys 55 mounted for vertical movement in the front rail 56 of the carriage, not otherwise shown. The tabulator keys 55 are mounted in suitable slots in top and bottom flanges of the carriage rail 56 and are urged to a raised position by a suitable spring 57 compressed between the bottom flange of the carriage rail 56 and the top of a slot in the key stem 55, as shown in Fig. 3. The key stems of the tabulator keys are provided with latching noses having a camming face 58 and a latching shoulder 59. Associated with the latching shoulders on the keys is a latching slide 60. The cam face 58 of the nose on a key, as the key is depressed, cams the latching slide 60 (to the left in Fig. 3) and the shoulder 59 thereafter latches under it, holding the key in its depressed and operative position. The depression of any key of the bank of keys 55 causes the release of all the other keys so depressed.

Associated with the tabulator keys 55 is a tabulator arm 65 (see Fig. 2) pivotally mounted on a cross-member 66 of the machine frame, as by stud 67. This arm 65 carries a round stud 68 which projects through a suitable aperture 72 in the cross-member 66, projecting into the path of a depressed tabulator key 55, as is shown in Fig. 3. The right-hand end of the arm 65 is provided with a perpendicular ear 70 which overlies the turned-over upper end 73 of a vertical operating slide 71. The arm 65 and slide 71 are resiliently urged to their raised position by a suitable spring 69 tensioned between a stud 74 on the frame plate 37 and the upper ear 73 of the slide 71. The depression of the slide 71 is operative, when the carriage is shifting to the right during a dividend entry operation, to terminate machine operation. The mechanism operated by the slide 71 is not pertinent to this invention and is not shown herein. It suffices to say that the depression of the slide 71 is inoperative in all cases except in the right-hand shifting of the carriage in a dividend entry operation. Thus, operation of slide 71 during any shifting of the carriage to the left, or shifting to the right in a division aligning phase of a division operation, is inoperative, as the proper mechanism has not been conditioned for operation from slide 71. However, whenever a tabulator key 55 is depressed and a dividend entry operation is initiated, the carriage registers are cleared and the carriage is shifted to the right until a depressed tabulator key 55 depresses the arm 65 and slide 71 to terminate operation and enter the dividend in that carriage position.

My invention relates to means whereby a division operation may be automatically terminated in any preselected order. I prefer to effect control of the automatic division stop mechanism by means of the depression of two adjacent tabulator keys 55, as shown in Figs. 3 and 4. This mechanism does not interfere in any way with the other operations of the machine, or the tabulating mechanism in other operations. During the carriage shift to the right the two depressed adjacent keys have no effect upon operation of the tabulating mechanism, nor do they have any effect on any operation other than division. During a dividend entry, with two keys depressed, the carriage is tabulated to the position of the lowest order, or right-hand, key and the dividend entered in that position and the operation terminated. However, during a division operation, when the carriage is being shifted periodically to the left at the end of operation in each order, the two keys jointly become effective to operate the division stop mechanism above-mentioned, stopping the machine after the termination of the shift from the lower order of such keys, whereby a correct quotient is registered in the quotient register for the corresponding order.

The preferred form of mechanism of my invention comprises an arm 100 (see Figs. 3 and 4) pivotally mounted on the cross-member 66, and for convenience I prefer to mount it on the back side thereof, and on the same pin 67 which supports the tabulator arm 65. This stop arm 100 extends to the right (to the left in Figs. 3 and 4, which are rear views of this mechanism) through a slot 101 (see Fig. 5) in the right-hand frame plate 37. To the right of the frame plate the arm 100 is bent in the form of a large elongated ear 102 extending downwardly as shown in Figs. 5 and 6.

The arm 100 is normally held in a raised position by a suitable spring 112 tensioned between a stud on the frame plate 37 and a projection 113 on the arm 100.

A suitable pin, or stud, 104 is fixedly secured to the lower end of the ear 102, and is embraced within a slot 105 on the forward end of a hook link 106. The rear end of the hook link 106 is supported by a pin, or stud, 107 carried by the upper end of a bellcrank 108. The bellcrank 108 is pivotally mounted on the pin 17 on the digitation control link 18. The forward end of the hook link 106 is formed with a hook, or shoulder, 109 adapted to engage a pin 48 on the division stop lever 35, when the arm 100 and link 106 are depressed as shown in Fig. 6. However, when the arm 100 is in its normal raised position (shown in Fig. 5) the hook, or shoulder, 109 passes above the pin 48.

The lower end of the bellcrank 108 is slotted, as shown at 110 to engage the latching pin 22 when the control lever 11 is rocked upwardly to control a division operation. The slot 110 is preferably beveled, as indicated at 111, to provide for ready engagement of the pin 22 in the slot 110, when the control lever 11 is rocked upwardly. It is obvious that when the control lever 11 is in its upper, or operative, position (shown in Fig. 6) the pin 22 is centered within the slot 110, whereby rocking of the control lever 11 to initiate the additive corrective cycle, the shifting of the carriage and the return to the subtractive position will be operative to move bellcrank 108 and thence move the link 106 forwardly and backwardly. The hook portion 109 is so positioned that whenever the arm 100 and the forward end of the hook member 106 are in their depressed, or operative, positions and the control lever 11 is translated rearwardly in the first cycle following an overdraft to cause the digitation slide 18 to move to the additive position, the shoulder 109 will engage the stud 48 and rock the lever 35 forwardly (counterclockwise about its pivot 36). Thus the division stop mechanism will be positioned in its forward operative position, in which event it is operative to terminate machine operation as soon as the shift cycle is completed and the mutilated gear 13 returns to its neutral or zero position.

The mechanism for operating the automatic stop arm 100 when two tabulator keys 55 are depressed, but not when only one is so depressed, is shown particularly in Figs. 3 and 4. This mechanism comprises a small slide 120 slidably mounted on the automatic stop arm 100 by a pair of horizontal slots 121 on the small slide 120 embracing corresponding pins 122 on the automatic stop arm 100. The slide 120 is urged to the right (left in these figures which are rear elevations of this mechanism) by a suitable spring 123 tensioned between a stud 124 on the automatic stop arm 100 and a stud 125 on the slide 120. The right-hand end of the slide 120 is cut away to form an aperture, or notch, 126 adapted to permit the stud 68 to be depressed without engaging slide 120 when the slide is in its normal, or right-hand, position shown in Fig. 3. The stop arm 100 is similarly apertured at the tabulator stud 68, as shown at 127 in Fig. 4. The apertures 126 and 127 are cut sufficiently deep to enable the stud 68 to be completely depressed without engaging the slide 120 or the automatic stop arm 100. To improve operation of the mechanism, the stud 68 on the tabulator arm 65 has its lower half cut away, as shown at 75, in order to provide a flat operative surface on the rear end thereof. Adjacent the aperture 126 on the slide 120 is a short nose or shoulder 128 sufficiently low to pass immediately below the flattened surface 75 of the tabulator stud 68 when the latter is in its raised position.

When the slide 120 is moved to the left (to the right in Fig. 4) this nose, or shoulder, 128 registers with the flattened surface 75 of the stud 68, whereupon the depression of the stud 68 by a depressed tabulator key 55 operates not only the tabulator arm 65 (which in this case is an idle operation as the mechanism controlled by the slide 71 is not conditioned for operation), but also the slide 120 and with it the automatic stop arm 100. It will be recalled that depression of the stop arm 100 rocks the hook link 106 downwardly so as to engage the stud 48 on the division stop arm 35 behind the hook portion 109 of the link 106. As the stud 68 is depressed by the locked key 55 as the carriage comes to its full ordinal position, the depressed key 55 will continue to rest upon the stud 68 holding it depressed and with it the arm 100. Thereby the arm 100 is maintained depressed throughout operation in that order of the machine—through all of the subtractive cycles to the overdraft, and through the corrective additive cycle (by which time the hook link 106 rocks the arm 35 as above described). The division operation will thereupon be terminated as soon as the shift to the next lower order is completed.

It will be obvious that if the slide is in its normal position, under the urgency of spring 123, the stud 68 will be operated by a depressed tabulator key 55 but this will have no effect (except in tabulating operations) as the mechanism controlled by slide 71 is not conditioned for operation, and the depression of the stud 68 will not be effective on slide 120 as it will pass vertically in the aperture 126 as well as the aperture 127 of the automatic control arm 100. However, when two adjacent tabulator keys are depressed, then the first one to the left (the rightmost one of those depressed in Figs. 3 and 4) while operative to depress stud 68, will be ineffective to operate automatic stop arm 100. However, as the carriage moves to the next ordinal position, the first depressed key 55 (indicated by 55a in Fig. 3) will engage a stud 135 riveted to, or otherwise securely mounted on, the slide 120. The spring 123 is light enough that the friction between the stud 135 and the beveled lower edge of the depressed key 55a will move the slide 120 to the left, from the position shown in Fig. 3 to that shown in Fig. 4, to the end of the slot 121. If the adjacent tabulator key 55 is not depressed, the lower end of the tabulator key 55 will rock the slide 120 and control arm 100 somewhat as it passes over the stud 135. However, this stud is so placed that the arm 100 is permitted to rise before the carriage reaches the next full ordinal position. Thus momentary depression of arm 100 and hook link 106 are of no effect as both are permitted to rise from the force of spring 112 to their normal ineffective position, before the connecting lever 11 is rocked. However, if an adjacent tabulator key such as 55b is also depressed, then the arm 100 is operated to terminate the division operation as above-described. This occurs as the movement of the slide 120 from the engagement of pin 135 by the first tabulator key 55a, will have moved the shoulder 128 under the flattened surface 75 of stud 68 as the carriage shifts to bring the lower end of key 55b into engagement with stud 68. The depression of stud 68, through friction with shoulder 128, holding the slide 120 in its left-hand position, not only rocks arm 100 but holds it in its rocked position until the carriage is again shifted. Thus the stop arm 100 is held rocked to its operative position throughout all of the operation in that order.

The operation of the mechanism of my invention is believed obvious. If one tabulator key 55 is depressed, the operation of this machine is exactly the same as that in conventional machines manufactured under the patents above-mentioned. However, if two adjacent keys are depressed, the first will have no effect upon the machine, but the second will be effective to cause the operation of the automatic division stop mechanism of my invention. The operation as above-mentioned, is terminated as soon as the carriage is shifted from the order of tabulator key 55b to the next lower ordinal position, thereby giving a correct, or true, quotient in the quotient register.

It will also be obvious that as many automatic stops can be made as desired. Thus for example, if it is desired to stop operation in the 7th and 3rd tabulator positions, the "8" and "7", and "4" and "3" tabulator keys 55 are depressed. It is conventional in the commercial machine with which the present invention is preferably associated, to restore the stop lever 35 to its intermediate position shown in Fig. 5 by means of a cam operated bellcrank engaging the ear 50 on the lower end of the stop lever 35 (as shown in the patent of Anthony B. Machado No. 2,653,765, Fig. 3, in which the cam 346 on the intermittently operated program shaft 251 engages the ear 345 of bellcrank 343 in the third cycle of the division programming operation, following the shifting cycle, the forward end 347 of the bellcrank engaging the ear 348 which corresponds to ear 50 in the instant application). In fact operation could be automatically terminated in each order except the highest by depressing all of the tabulator keys 55. By means of my invention the operator is enabled to selectively terminate a division operation automatically in any ordinal position of the carriage, except the highest.

I claim:

1. In a calculating machine having a frame, a carriage shiftable relatively to said frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a detent means for maintaining said division mechanism in its operative condition, a division stopping mechanism effective to release said detent means during the operation of the shifting means in the order in which the machine is operating at the time the stopping mechanism is operated, a manual means for operating said stopping mechanism, and ordinally arranged tabulating keys mounted in said carriage, the combination which comprises a control member mounted in said frame, an adjustable member operative when set to effective position to condition said control member for operation by an operated key when the carriage is in the related ordinal position, means for positioning said adjustable member in effective position, and means operated by said control member for operating said division stop mechanism to terminate a division operation.

2. In a calculating machine having a frame, a shiftable carriage mounted in said frame, an ordinally arranged accumulator mounted in said carriage, a selection mechanism in said frame, an accumulator driving means under the control of said selection mechanism for differentially driving said accumulator, means for shifting the carriage, a division control mechanism operative to control operation of said accumulator driving means and said shifting means to divide a dividend registered in said accumulator by a divisor set in said selection means, a means for holding said division mechanism in its operative position, a divsion stopping mechanism operative during the first succeeding operation of the shifting means to release said holding means, and ordinally arranged tabulating keys mounted in said carriage, the combination which comprises an operating member mounted in said frame, means normally unaffected by an operated key for operating said operating member, means for conditioning said last mentioned means for operation by an operated key when the carriage is in the related ordinal position in a division operation, and means operated by said operating member for operating said division stopping mechanism.

3. In a cyclically operable calculating machine having a frame, a shiftable carriage mounted in said frame, an ordinally arranged accumulator mounted in said carriage, a selection mechanism in said frame, an accumulator driving means under the control of said selection mechanism for differentially driving said accumulator, means for shifting the carriage, a division control mechanism operative to control operation of said accumulator driving means and said shifting means to divide a dividend registered in said accumulator by a divisor set in said selection mechanism, a latch for holding said division control mechanism in its operative position, and a division stopping mechanism operative during the first succeeding operation of the shifting means to release said latch, the combination which comprises a plurality of positionable keys mounted in said carriage corresponding to the ordinal positions of the carriage, an operating member mounted in said frame and operated by a positioned key when the carriage is in the related ordinal position, and means operated by said operating member for operating said division stopping mechanism.

4. In a cyclically operable calculating machine having a frame, a shiftable carriage mounted in said frame, an ordinally arranged accumulator mounted in said carriage, a selection mechanism in said frame, an accumulator driving means under the control of said selection mechanism for differentially driving said accumulator, means for shifting the carriage, a division control mechanism operative to control operation of said accumulator driving means and said shifting means to divide a dividend registered in said accumulator by a divisor set in said selection mechanism, a latch for holding said division mechanism in its operative position, a division stopping mechanism operative during the next operation of the shifting means to release said latch, and ordinally arranged tabulating keys mounted in said carriage and normally ineffective in division operation, the combination which comprises an operating member mounted in said frame, an adjustable interponent operative when set to effective position to condition said operating member for operation by an operated key whenever the carriage is in the related ordinal position in a division operation, means operated by an adjacent one of said keys for positioning said interponent in its operative position, and means controlled by the operation of said operating member for operating said division stopping mechanism.

5. In a caucullating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a latch for holding said division mechanism in its operative condition, a division stopping mechanism effective to release said latch during the operation of the shifting means in the order in which the machine is operating at the time the stopping mechanism is operated, and a manual means for operating said stopping mechanism, the combination which comprises a plurality of ordinally arranged tabulator keys mounted in said carriage, a control member, an adjustable member operable to condition said control member for operation by an operated key, means for positioning said adjustable member in operating position, and means operated by said control member for operating said division stopping mechanism.

6. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a latch for holding said division mechanism in its operative condition, a division stopping mechanism effective to release said latch during the operation of the shifting means in the order in which the machine is operating at the time the stopping mechanism is operated, and a manual means for operating said stopping mechanism, the combination which comprises a plurality of ordinally arranged tabulator keys mounted in said carriage, a control member, an adjustable member positioned in operating position by an operated one of said keys and operable when so operated to condition said control member for operation by another operated key, and means operated by said control member when it is actuated by said other operated key for operating said division stopping mechanism.

7. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and shifting means to divide a dividend in said accumulator by a divisor in said keyboard, a means for holding said division mechanism in its operative condition, a division stopping mechanism effective to return said division mechansm to an inoperative position during the operation of the shifting means in the order in which the machine is operating at the time the stopping mechanism is operated, a manual means for operating said stopping mechanism, and ordinally arranged tabulating keys mounted in said carriage, the combination which comprises a stop arm mounted in said frame and operated by an operated key upon movement of said carriage to an ordinal position corresponding to the operated key, and means controlled by said stop arm for operating said division stopping mechanism.

8. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a power means for said division mechanism, a means for holding said division mechanism in its operative condition, a division stopping mechanism effective to return said division mechanism to its inoperative position during the operation of the shifting means in the order in which the machine is operating at the time the stopping mechanism is operated, a manual means for operating said stopping mechanism, and ordinally arranged tabulating keys mounted in said carriage, the combination which comprises a stop arm mounted in said frame, adjustable means for operating said stop arm by a depressed key upon movement of said carriage to a position corresponding to the depressed key, and means operated by said stop arm for operatively connecting said division stopping mechanism to said power-operated means for operation of the former by the latter.

9. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a means for holding said division mechanism in its operative condition, a division stopping mechanism effective to return said division mechanism to its inoperative position during the operation of the shifting means in the order in which the machine is operating at the time the stopping mechanism is operated, a manual means for operating said stopping mechanism, and ordinally arranged tabulating keys mounted in said carriage, the combination which comprises a normally inoperative operating member mounted in said frame, an adjustable member operable to condition said operating member for operation by a depressed tabulator key, means for positioning said adjustable member in its effective position, and means controlled by said operating member for operating said division stopping mechanism.

10. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism including a power operated member operative to control operation of said differential drive means and said shifting means to divide a dividend in said accumulator by a divisor in said keyboard, a latch for holding said division mechanism in its operative condition, a division stopping mechanism effective to release said latch during the operation of the shifting means in the order in which the machine is operating at the time the stopping mechanism is operated, a manual means for operating said stopping mechanism, and ordinally arranged tabulating keys mounted in said carriage, the combination which comprises a normally inoperative stop arm mounted in said frame, means for selectively operating said stop arm by a depressed tabulator key upon movement of said carriage to a position corresponding to a depressed tabulator key, and a means controlled by operation of said stop arm for operatively connecting said division stop mechanism to said power-operated member.

11. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism including a power operated member operative to control operation of said differential drive means and said shifting means to divide a dividend in said accumulator by a divisor in said keyboard, a latch for holding said division mechanism in its operative condition, a division stopping mechanism effective to release said latch during the operation of the shifting means in the order in which the machine is operating at the time the stopping mechanism is operated, a manual means for operating said stopping mechanism, and ordinally arranged tabulating keys mounted in said carriage, the combination which comprises a normally inoperative control member mounted in said machine and adapted to be operated, when conditioned for operation, by a depressed tabulator key when the carriage is in the related ordinal position, a normally inoperative link for connecting said division stop mechanism to said power-operated member, means operated by said control member when operated for positioning said link in connecting position, and means controlled by another depressed one of said tabulator keys to condition said control member for operation by said first-mentioned tabulator key.

12. In a calculating machine having a frame, a carriage shiftable relatively to a frame, an ordinally arranged accumulator mounted in said carriage, a keyboard, a differential drive means controlled by said keyboard for operating said accumulator, means for shifting said carriage, an automatic division mechanism operative to control operation of said differential drive means and said shifting means to divide a dividend in said accumulator by a divisor in said keyboard, a latch for holding said division mechanism in its operative condition, a division stopping mechanism effective to release said latch during the operation of the shifting means in the order in which the machine is operating at the time the stopping mechanism is operated, a manual means for operating said stopping mechanism, and ordinally arranged tabulating keys mounted in said carriage, the combination which comprises a stop member mounted in said frame, a normally inoperative interponent positionable to cause operation of said stop member by a depressed tabulator key upon shifting of said carriage to a position corresponding to the depressed tabulator key, means controlled by another depressed tabulator key for moving said interponent to its operative position, and means adjusted by said stop member and operated by said division mechanism for operating said division stop mechanism.

References Cited in the file of this patent

UNITED STATES PATENTS

| | | |
|---|---|---|
| 1,292,513 | Rechnitzer | Jan. 28, 1919 |
| 2,211,736 | Avery | Aug. 13, 1940 |
| 2,318,241 | Mathi | May 4, 1943 |
| 2,327,981 | Friden | Aug. 31, 1943 |
| 2,403,273 | Friden et al. | July 2, 1946 |
| 2,546,893 | Hilder | Mar. 27, 1951 |